(12) United States Patent
Kang et al.

(10) Patent No.: US 9,783,128 B2
(45) Date of Patent: Oct. 10, 2017

(54) VEHICLE CAMERA DEFOGGING VENT WITH GLARE MITIGATION

(71) Applicants: Shaoying Kang, Ann Arbor, MI (US);
Thomas White, Gregory, MI (US);
Robert Newton, Chesterfield, MI (US)

(72) Inventors: Shaoying Kang, Ann Arbor, MI (US);
Thomas White, Gregory, MI (US);
Robert Newton, Chesterfield, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 14/956,681

(22) Filed: Dec. 2, 2015

(65) Prior Publication Data
US 2016/0167595 A1     Jun. 16, 2016

Related U.S. Application Data

(60) Provisional application No. 62/091,672, filed on Dec. 15, 2014.

(51) Int. Cl.
*H04N 5/225* (2006.01)
*B60R 11/04* (2006.01)
*G03B 17/55* (2006.01)
*B60R 11/00* (2006.01)

(52) U.S. Cl.
CPC .............. *B60R 11/04* (2013.01); *G03B 17/55* (2013.01); *H04N 5/2252* (2013.01); *H04N 5/2257* (2013.01); *B60R 2011/0026* (2013.01)

(58) Field of Classification Search
CPC ............ B60R 11/04; B60R 2011/0026; H04N 5/2257; H04N 5/2252; G03B 17/55
USPC ................ 348/118, 143, 148, 151, 373–376
See application file for complete search history.

(56) References Cited

U.S. PATENT DOCUMENTS

| 4,163,415 A | * | 8/1979 | Neveux ................... B60H 1/28 137/897 |
| 2005/0001901 A1 | * | 1/2005 | Eggers ................... B60R 11/04 348/118 |

* cited by examiner

*Primary Examiner* — Yogesh Aggarwal
(74) *Attorney, Agent, or Firm* — Tarolli, Sundheim, Covell & Tummino LLP

(57) ABSTRACT

Apparatus for use with a camera module having an imager and adapted for mounting on the inside surface of a vehicle window. The apparatus comprising structures sized and positioned to block reflections that might otherwise impinge on the imager from below the module, while still permitting the flow of air onto the window surface within the imager's field of view.

16 Claims, 4 Drawing Sheets

VEHICLE CAMERA DEFOGGING VENT WITH GLARE MITIGATION

CROSS REFERENCE TO RELATED APPLICATIONS

This application claims priority to and the benefit of U.S. Provisional Application Ser. No. 62/091,672, filed 15 Dec. 2014, entitled VEHICLE CAMERA DEFOGGING VENT WITH GLARE MITIGATION. The above-identified provisional application is incorporated herein by reference in its entirety for all purposes.

FIELD OF THE INVENTION

The present invention is directed to window-mounted cameras for motor vehicles, and more particularly to defogging vents structures that reduce window reflections that might interfere with camera operation.

BACKGROUND

Motor vehicles increasingly are equipped with windshield-mounted digital camera modules for observing the roadway in front of the vehicle. The camera modules contain a digital imager, as well as a microcomputer for analyzing the digital video signals generated by the imager. Some camera modules include multiple (e.g. stereo) imagers, and perhaps even multiple microcomputers (e.g., a dedicated image processor and a module processor). The camera modules perform various functions including lane departure warning, lane keeping assistance, automatic high beam control, forward crash warning, and traffic sign recognition. Even more sophisticated autonomous vehicle functions will likely be implemented in or with such camera modules in the future.

The camera module is typically mounted to the inside of the vehicle windshield, at a high central location. The location is inside the sweep of the vehicle windshield wipers so that the outer surface of the windshield, at the mounting location, is cleared of rain, snow, and other surface contaminants. Moreover, the camera module will preferably have an air channel for receiving air flows generated by the vehicle defroster, so that any fogging of the inside surface of the window glass at the module mounting location is also cleared.

SUMMARY OF THE INVENTION

Light reflected from surfaces within the vehicle, such as the dashboard, may pass through the air flow channel in the camera module and be further reflected from the window glass to which the camera is attached. Such glare may impinge on the imager and thereby interfere with the operation of the camera. The present invention alleviates this problem.

In accordance with one example embodiment of the present invention, apparatus is provided for use with a camera module having an imager that is adapted for mounting on the inside surface of a vehicle window such that the imager looks out through the vehicle window. The apparatus comprises a camera mounting element having an opening sized and positioned to permit a flow of air onto the window surface through which the imager looks and also to block light reflections from below the module that might otherwise impinge on the imager.

In accordance with another example embodiment of the present invention, apparatus is provided for use with a camera module having an imager that is adapted for mounting on the inside surface of a vehicle window such that the imager looks out through the vehicle window. The apparatus comprising a camera mounting element having an opening sized and positioned to permit a flow of air onto the window surface through which the imager looks and also to block light reflections that might otherwise impinge on the imager from below the module. The camera mounting element includes a frame defining an opening for receiving a flow of air from below the apparatus, the frame channeling the flow of air onto the window surface through which the imager looks. The frame includes plural elements that protrude into the opening and towards the window glass, with the spacing between the elements and the window glass being selected to prevent light reflections from passing there between. The plural elements are vertically and horizontally spaced across at least a portion of the opening such that air can flow between the elements but rays of light reflecting up towards the frame from below are blocked by at least one of the elements.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
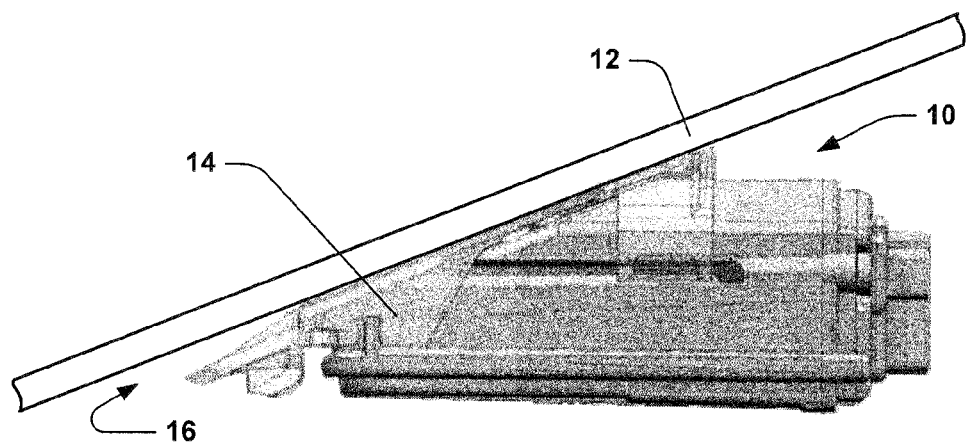
FIG. 1 is an elevation view of a camera module attached to a vehicle windshield.

Referring to FIG. 1, a camera module 10 is removably attached to a vehicle forward windshield 12 via a camera mounting system including a bracket 14. Bracket 14 has locking tabs that resiliently engage matching detents in module 10. The lower portion of bracket 14 is angled away from the window glass to provide an air channel 16 through which defroster air may pass to reach and defog the window surface through which the camera module 10 looks.

Figure 2:
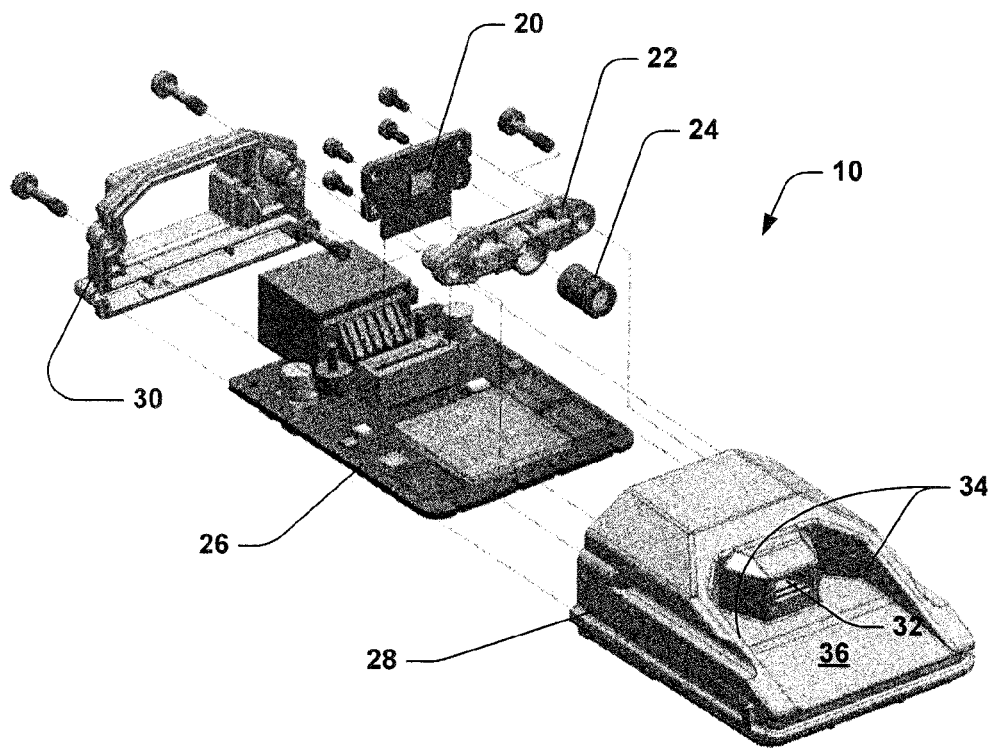
FIG. 2 is an exploded perspective view of the module of FIG. 1, showing the constituent elements of the camera module.

As seen in FIG. 2, the module 10 includes a forward facing CMOS imager 20 that looks through a lens assembly 24. Lens assembly 24 is held in proper registration over the imager by a lens bracket 22. The imager and lens assembly plugs into a main printed circuit board ("PCB") 26, making electrical connection with the components mounted thereon, including an image processor chip and a microcomputer. The microcomputer operates under software program control to use information from the imager to provide appropriate output information. A connector at the rear of PCB 26 provides connection with the rest of the vehicle, supplying power to the module while also providing a conduit for appropriate input/output messages between the module and the vehicle. The circuitry, including PCB 26 with imager and lens assembly attached, slides into guides within a housing 28 that is closed by a rear cover 30.

When thus mounted in the housing, the imager and lens assembly will be aligned with an aperture 32 in housing 34. The imager and lens are positioned and oriented to have a field of view forward of the module 10. When the module is snapped into the bracket 14, the camera field of view aligns with a predetermined portion of the roadway forward of the vehicle. Aperture 32 is at the back of a module sight cavity defined in housing 34 by opposing vertical walls 34 and a lower deck 36. The side walls and lower deck are each slanted, flaring away from aperture 32 at an angle sufficient to keep them outside of the field of view of imager 20.

Figure 3:
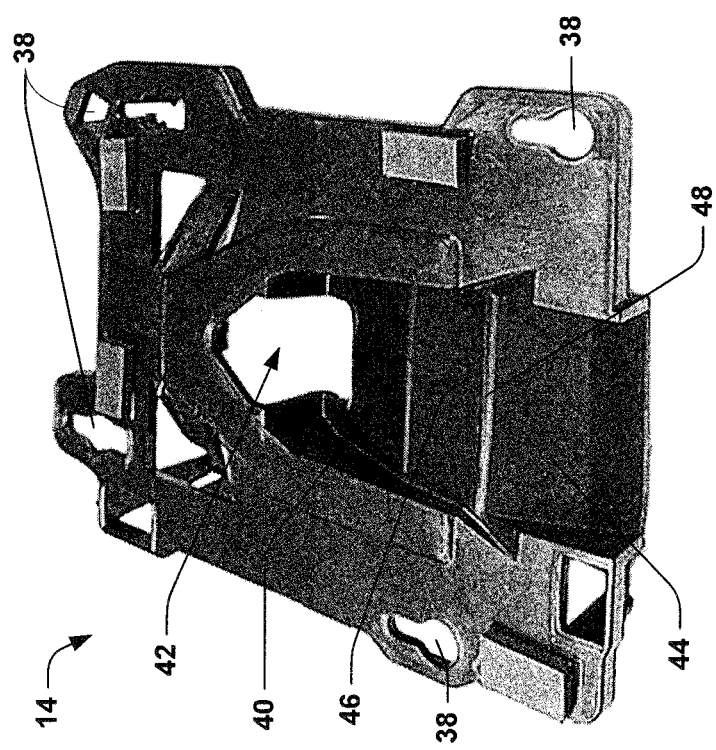
FIG. 3 is a perspective view of a camera module mounting bracket.

One version of a mounting bracket 14 is shown in FIG. 3. Mounting bracket 14 is a single, injection molded piece having foam pads (unnumbered) glued on the side facing the window glass. Bracket 14 has four keyhole openings 38 formed therein for receiving respective spool-shaped pins (not shown) affixed to the window glass, and will be securely held against the window glass when engaged over such pins. As stated previously, module 10 in turn snaps into bracket 14 by resilient fastening tabs (unnumbered) on bracket 14 and is held in a predetermined alignment relative to the window glass via the bracket.

Bracket 14 has side wall and lower deck surfaces defining a bracket sight cavity 40 with geometry similar to the module sight cavity. Bracket sight cavity 40, however, has dimensions sufficiently smaller than the corresponding dimensions of the module sight cavity that the bracket sight cavity is closely received by, and nests within, the module sight cavity when module 10 is mounted on the bracket. A cutout 42 at the rear of bracket sight cavity 40 receives aperture 32 of module 10. Cutout 42 provides the camera module with an unobstructed forward view through bracket sight cavity 40 of the vehicle window and to the roadway beyond.

Mounting bracket 14 further has integrally formed therewith a ramp 44 forming a continuation of the slanted lower deck surface 46 of bracket sight cavity 40. Ramp 44 is folded downward away from surface 46 along a fold line 48. When bracket 14 is mounted on a vehicle window, fold line 48 is rather close to the vehicle window but is spaced therefrom by a selected amount, thereby defining an air gap. Since ramp 44 is folded downward away from the fold line at an angle greater than the angle of the window glass, ramp 44 projects away from the window glass, providing a guide surface and entry path for air flow from the vehicle window defroster and through the air gap. Defroster air flow is guided by ramp 44 through the air gap between fold line 48 and the vehicle window glass and thus onto the window surface covered by bracket sight cavity 40. The flow of defroster air into and through the bracket sight cavity keeps the portion of the vehicle window that is within the camera's field of view clear of unwanted fogging.

Unfortunately, the gap between fold line 48 and the window glass also provides a path for light that may impinge upon and reflect from parts of the vehicle, particularly the vehicle dashboard. Light reflections from below the module may thus graze the window in the vicinity of fold line 48 and be further reflected into imager aperture 32 of housing 34 and thus into the imager of the camera module. Light reflections of this sort in the camera's field of view are undesirable because they obscure or otherwise interfere with the image of the scene forward of the vehicle.

In accordance with the present invention, dashboard window glass reflections are prevented by novel structures that permit defroster air flow through the bracket air gap while blocking unwanted reflections in the camera's field of view from below the module.

Figure 4:
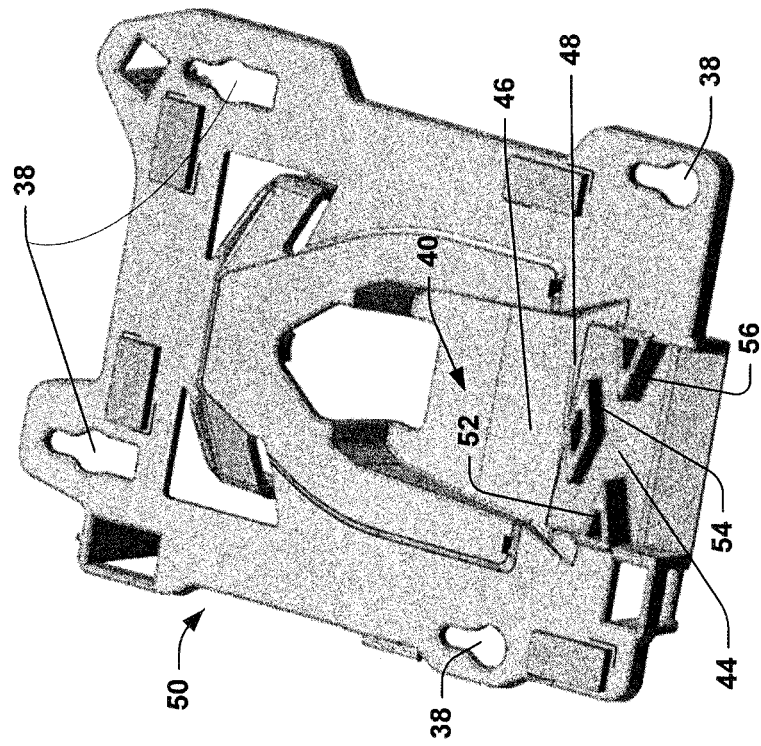
FIG. 4 is a perspective view of a mounting bracket in accordance with one example embodiment of the present invention.

One example embodiment of the present invention is shown in FIG. 4, which is a perspective view of a modified mounting bracket 50. Bracket 50 is generally similar to bracket 14, as described above, and elements of bracket 50 which correspond to similar elements of bracket 14 are identified by corresponding reference numbers. Bracket 50 is attached to the window glass in the same manner as bracket 14, and further has a bracket sight cavity 40 with a lower deck surface 46. A ramp adjoins the deck surface along a fold line 48.

In accordance with this embodiment of the present invention, however, light reflections are blocked by several diamond-shaped upright structures 52, 54, and 56 formed on ramp 44. The structures are spaced from one another, thereby still permitting defroster air flow through to bracket sight cavity 40. Each structure 52, 54, 56 projects from the surface of ramp 44 towards the window glass, and has a height chosen such that the top surface of each structure (as seen in FIG. 4) is parallel to the window glass and is spaced therefrom by a small gap, e.g. about 1 mm. The gap is provided to allow additional defroster air flow between the top surface of each structure and the window glass. If the gap is small enough, and the top surface is broad enough, light reflections will not bleed through the gap and into the bracket sight cavity 40. More specifically, if the top surface of each structure is broader in the direction of light travel, then the gap may be made larger and, conversely, if the top surface is narrower in the direction of light travel, then the gap should be smaller to prevent reflection bleed-through. The actual functional relationship between the top surface breadth and resulting gap spacing will be dependent upon dashboard and window geometry, and may be determined by conventional ray tracing, in a computer model, of light reflections from the dashboard surface below the camera module up onto the window glass. Such ray tracing analysis will preferably take into account reflections from the outside surface of the window glass as well as the inside surface, and also light transmission and reflection effects introduced by surface coatings or internal (e.g., PVB) layers.

Light blocking structure 52, 54, 56 are transversely and longitudinally spaced across ramp 44 so that their transverse edges overlap to block reflections between the light blocking structures. "Longitudinal," in this sense, refers to a direction perpendicular to fold line 48, whereas "transverse" refers a direction across the width of the ramp, parallel to fold line 48. In the context of a bracket installed on a vehicle window, 'transverse' spacing equates generally to 'horizontal' spacing. Thus, when two structures are said to have different longitudinal spacing, it is meant that the two structures are perpendicularly spaced from fold line 48 by different amounts. In a similar sense, when two structures are said to have different transverse spacing, it is meant that they are horizontally spaced from one another across the width of ramp 44.

In FIG. 4, structure 54 has an elongated diamond configuration. Structure 54 is formed at a central transverse location on ramp 44, near the top of the ramp, and has a transverse dimension large enough to overlap the transverse edges of adjacent structures 52, 56. Structures 52, 56 are half-diamonds (that is, the structures are the right and left halves, respectively, of an elongated diamond split across two vertices), with the sectioned boundary of structure 52 being adjacent the left edge of ramp 44 (as seen in the Figure) and the sectioned boundary of structure 56 being adjacent the right edge of ramp 44. Structures 52, 56 are co-linearly positioned along a line that is longitudinally spaced from structure 54 so that facing surfaces of the respective structures are spaced from one another to permit air flow therebetween. Each of structures 52, 56 has a respective transverse dimensions one half that of diamond element 54, whereby the transverse extremities of diamond structure 54 overlap the transverse right and left extremities, respectively, of half-diamond structures 52, 56.

Because of the transverse overlap of the structures, light reflected from a point vertically below the bracket will be fully blocked by light blocking structures 52, 54, and 56. Of course, reflections from the dashboard will not arise just from a single point vertically below the bracket, but will instead arise from an extended horizontal expanse of the dashboard. Reflections from off-center portions of the dashboard could thread obliquely through the spaces between the structures. To avoid this, it is desirable to have a somewhat greater overlap of structures 52, 54, and 56. The overlap of the structures will be chosen to optimize the blocking of light reflections from dashboard while minimizing the interference with the flow of defroster air onto the window glass adjacent the bracket optical sight cavity. The structures are, moreover, outside of the field of vision of the camera because they are disposed on the ramp 44, which slants away from the deck of sight cavity 40.

The diamond shaped, light blocking structures of FIG. 4 may be replaced with alternate structures having other sizes and shapes. FIGS. 5 through 8 illustrate a few of the possibilities. Each of these figures is a portion of a plan view of a bracket installed on window mounting pins, with a camera module installed on the bracket. The bracket 60 is similar, but not identical, to bracket 50 and has a sight cavity 62. The lens 64 of the camera module is similar to lens 24 of FIG. 2, except that lens 64 in this figure extends out of the camera module housing 66 and into bracket sight cavity 62. The disk-shaped bases 68, 70 of two of the four window mounting pins are visible.

Figure 5:
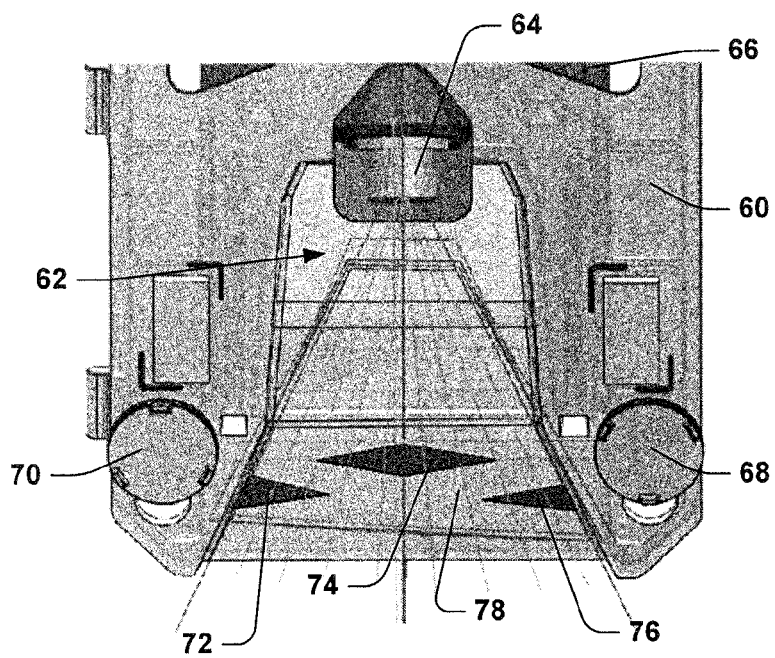
FIGS. 5 through 8 are plan views of other example embodiments of mounting brackets in accordance with the present invention, with a camera module installed in each bracket.

The FIG. 5 light blocking structures are similar to those described with respect to FIG. 4, comprising three diamond structures 72, 74, and 76. The ramp 78 of the FIG. 5 embodiment has a transversely flared profile, however, and the transverse dimensions of structures 72 and 76 have been correspondingly extended to block reflections all the way to the transverse edges of the flared profile.

Figure 6:
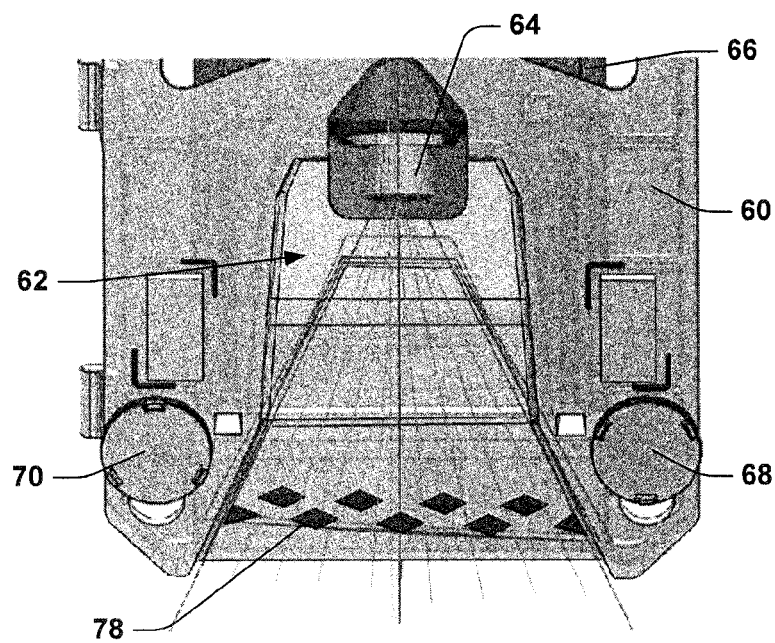

The FIG. 6 light blocking structures comprise a larger number of smaller diamonds 80. In the figure, nine smaller diamonds 78 are formed across the ramp in two staggered transverse rows, with four diamonds in the upper row and five diamonds in the lower row. As with the prior embodiments, the transverse extent of each diamond in one row overlaps the transverse extent of neighboring diamonds in the adjacent row, whereby light reflections from the dashboard are blocked. The spacing between the structures and between the rows assures that defroster air can circulate into and around the window surface to which the bracket is attached.

Figure 7:
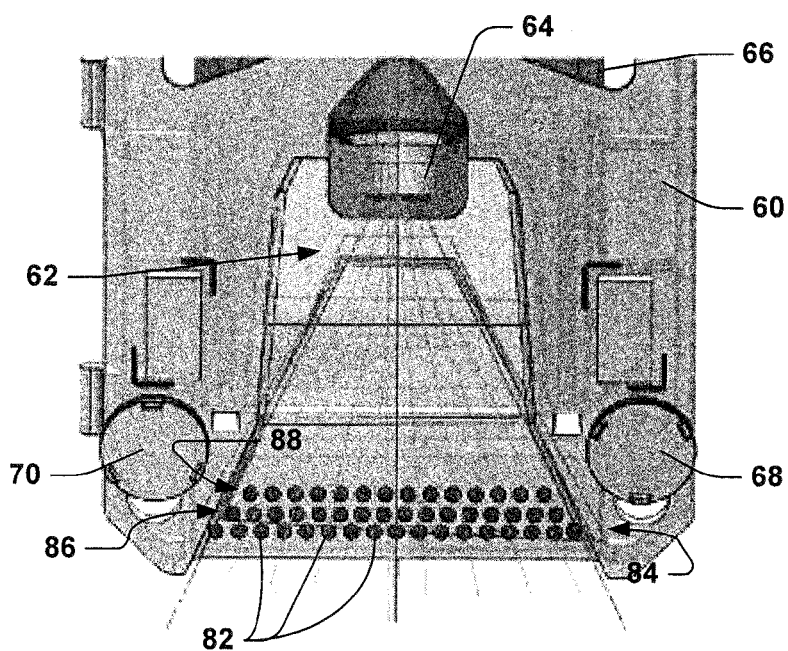

The FIG. 7 light blocking structures comprise an even larger number of small cylindrical pins 82. In the figure, several dozen pins 82 are formed across the ramp in three staggered transverse rows 84, 86, and 88. As with the prior embodiments, the transverse extent of each pin in one row overlaps the transverse extent of adjacent pins in one or more of the other two rows, whereby light reflections from the dashboard are blocked. The spacing between the elements and between the rows again assures that defroster air can circulate into and around the window surface to which the bracket is attached.

Figure 8:
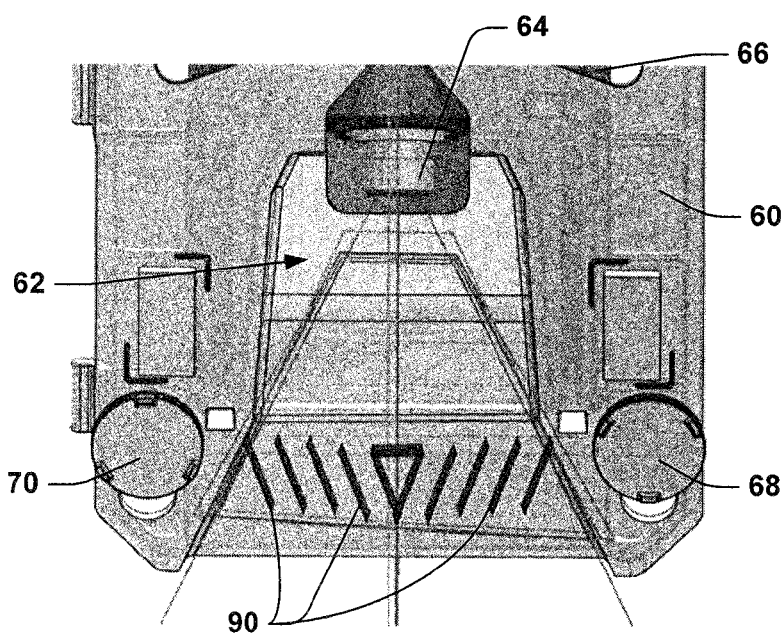

The FIG. 8 light blocking structures comprise a row of elongated, ribs 90. Each rib is oblique, slanted diagonally with respect to the longitudinal and transverse directions. Ribs 90 are oriented symmetrically with respect to the optical center of lens 64, with those ribs to the left of the centerline being slanted up and to the left and those ribs to the right of the centerline being slanted up and to the right. The ribs on either side of, and nearest to, the centerline touch at their lower extreme, forming two legs of a central triangle. As with the prior embodiments, the transverse extent of each rib overlaps the transverse extent of adjacent ribs, whereby light reflections from the dashboard are blocked. The spacing between the ribs again assures that defroster air can circulate into and around the window surface to which the bracket is attached.

All of the structures illustrated and described above may have top surfaces that are spaced from the window glass by respective gaps. However, if such gaps are provided, care must be taken to insure that reflections from the dashboard do not 'skip' through the gap and into the bracket sight cavity. As described previously with respect to FIG. 4, there will be a functional relationship between the breadth of the respective top surfaces in the direction of light travel (that is, the longitudinal dimension of the top surface) and the preferred gap size. For small structures, such as those of FIGS. 6 and 7, reflections that succeed in making it through the gap above one structure may be effectively blocked by other, nearby structures. Thus, where a design is selected having many small structures, a more sophisticated analysis taking into account the entire cooperative arrangement of structures may be in order. Of course, the use of many small structures enhances air flow around the transverse edges of the structures. Thus, there will be limited additional benefit from increasing defroster air flow via window gaps. In such cases, the structures may be designed and precisely molded to be tall enough to close the gaps entirely.

The light blocking structures could of course have other geometries. The illustrated large and small diamonds and small cylindrical pins are merely a few examples. The structures could be straight-line bar segments, ovals, other regular polygons, etc. Moreover, they need not all be of the same size nor of regular spacing. Irregular, seemingly random patterns of blocking structures may be distributed across the face of the ramp with satisfactory efficacy. Moreover, although the blocking structures can be formed integrally with the air guide ramp (as illustrated) by suitable shaping of the die used for injection molding the mounting bracket, the blocking structures could instead comprise one or more separate pieces (e.g. a simple transverse bar) molded separate from the mounting bracket and attached directly to the inside surface of the window glass above the air guide ramp. In such cases, the air guide ramp will have a smooth planar expanse, similar to that shown in FIG. 3, since the light blocking structures will no longer be integral with the ramp. Where the light-blocking structure(s) are fixed directly to the window glass in this fashion, defroster air will yet bypass the structure(s) via transverse spaces between and around the structures, and also via gaps between the structures and the ramp (i.e., the gaps between the bottoms of the respective structures and the smooth planar top surface of the ramp). In any case, such structures will be designed to provide the dual benefits of blocking light while permitting air flow.

From the above description of the invention, those skilled in the art will also perceive other improvements, changes and modifications. Such improvements, changes and modifications within the skill of the art are intended to be covered by the appended claims.

Having described the invention, the following is claimed:

1. Apparatus for use with a camera module having an imager that is adapted for mounting on the inside surface of a vehicle window such that the imager looks out through the vehicle window, said apparatus comprising a camera mounting element having an opening sized and positioned to permit a flow of air onto the window surface through which the imager looks and at least one element protruding into said opening to block light reflections from below the module that might otherwise impinge on the imager, said at least one element permitting a flow of air through said opening onto said window surface through which said imager looks.

2. Apparatus as set forth in claim 1, wherein said camera mounting element is fixed to said camera module.

3. Apparatus as set forth in claim 1, wherein said camera mounting element includes a frame defining an opening for receiving a flow of air from below said apparatus, said frame channeling said flow of air onto said window surface through which said imager looks, said at least one element protruding into said opening to block light reflections from below the module.

4. Apparatus for use with a camera module having an imager that is adapted for mounting on the inside surface of a vehicle window such that the imager looks out through the vehicle window, said apparatus comprising a camera mounting element having an opening sized and positioned to permit a flow of air onto the window surface through which the imager looks and also to block light reflections from below the module that might otherwise impinge on the imager, said camera mounting element including a frame defining an opening for receiving a flow of air from below said apparatus, said frame channeling said flow of air onto said window surface through which said imager looks, said frame also including at least one element protruding into said opening to block light reflections from below the module, wherein said at least one element comprises plural elements protruding into said opening from associated locations, said plural elements being horizontally spaced across at least a portion of said opening.

5. Apparatus as set forth in claim 4, wherein said plural elements have regular polygonal cross sections.

6. Apparatus as set forth in claim 4, wherein said plural elements each have a generally diamond-shaped cross section.

7. Apparatus as set forth in claim 4, wherein said plural elements each have a generally circular cross section.

8. Apparatus as set forth in claim 4, wherein said plural elements are organized in plural rows, each row being oriented generally horizontally, said rows being vertically stacked one above the other, with the elements in one row being offset horizontally from elements in an adjacent row.

9. Apparatus as set forth in claim 4, wherein said plural elements protrude into said opening at associated locations that are spaced in an irregular pattern across at least a portion of said opening.

10. Apparatus for use with a camera module having an imager that is adapted for mounting on the inside surface of a vehicle window such that the imager looks out through the vehicle window, said apparatus comprising a camera mounting element having an opening sized and positioned to permit a flow of air onto the window surface through which the imager looks and also to block light reflections from below the module that might otherwise impinge on the imager, said camera mounting element including a frame defining an opening for receiving a flow of air from below said apparatus, said frame channeling said flow of air onto said window surface through which said imager looks, said frame also including at least one element protruding into said opening to block light reflections from below the module, wherein said at least one element comprises plural elements protruding into said opening towards said window glass, with the spacing between said elements and said window glass being selected to prevent light reflections from passing there between.

11. Apparatus for use with a camera module having an imager that is adapted for mounting on the inside surface of a vehicle window such that the imager looks out through the vehicle window, said apparatus comprising a camera mounting element having an opening sized and positioned to permit a flow of air onto the window surface through which the imager looks and also to block light reflections that might otherwise impinge on the imager from below the module, said camera mounting element including a frame defining an opening for receiving a flow of air from below said apparatus, said frame channeling said flow of air onto said window surface through which said imager looks, said frame including plural elements that protrude into said opening and towards said window glass, with the spacing between said elements and said window glass being selected to prevent light reflections from passing there between, said plural elements being vertically and horizontally spaced across at least a portion of said opening such that air can flow between the elements but that rays of light reflecting up towards said frame from below are blocked by at least one said element.

12. Apparatus as set forth in claim 11, wherein said plural elements have regular polygonal cross sections.

13. Apparatus as set forth in claim 11, wherein said plural elements have generally diamond-shaped cross sections.

14. Apparatus as set forth in claim 11, wherein said plural elements have generally circular cross sections.

15. Apparatus as set forth in claim 11, wherein said plural elements are organized in plural rows, each row oriented generally horizontally, said rows being vertically stacked one above the other, with the elements in one row being offset horizontally from elements in an adjacent row.

16. Apparatus as set forth in claim 11, wherein said plural elements protrude into said opening at associated locations that are vertically and horizontally spaced in an irregular pattern across at least a portion of said opening.

* * * * *